US012640588B2

(12) United States Patent
Liu

(10) Patent No.: US 12,640,588 B2
(45) Date of Patent: May 26, 2026

(54) METHOD AND APPARATUS FOR WIRELESS CHARGING CONTROL, AND STORAGE MEDIUM

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 1023 days.

(21) Appl. No.: 17/767,786

(22) PCT Filed: Oct. 11, 2019

(86) PCT No.: PCT/CN2019/110675
§ 371 (c)(1),
(2) Date: Apr. 8, 2022

(87) PCT Pub. No.: WO2021/068211
PCT Pub. Date: Apr. 15, 2021

(65) Prior Publication Data
US 2024/0088709 A1 Mar. 14, 2024

(51) Int. Cl.
*H02J 7/90* (2026.01)
*H02J 7/80* (2026.01)
*H02J 50/10* (2016.01)
*H02J 50/40* (2016.01)
*H02J 50/80* (2016.01)
*H02J 50/90* (2016.01)

(52) U.S. Cl.
CPC .............. *H02J 50/10* (2016.02); *H02J 7/80* (2026.01); *H02J 7/975* (2026.01); *H02J 50/402* (2020.01); *H02J 50/80* (2016.02); *H02J 50/90* (2016.02)

(58) Field of Classification Search
CPC ................................................... H02J 7/00309
USPC ............................................................ 320/108
See application file for complete search history.

(56) References Cited

U.S. PATENT DOCUMENTS 10,574,079 B1 * 2/2020 Berkowitz ............ H02J 7/0029
2018/0159361 A1 * 6/2018 Cong ........................ G01J 5/07

FOREIGN PATENT DOCUMENTS

CN 106512214 A 3/2017
CN 106786875 A * 5/2017 .............. H02J 50/10
CN 106911190 A 6/2017
CN 107834711 A 3/2018
CN 108923509 A 11/2018
CN 109729750 A 5/2019
(Continued)

OTHER PUBLICATIONS

European Patent Application No. 19948477.5, Search and Opinion dated May 5, 2023, 7 pages.
(Continued)

*Primary Examiner* — Ahmed H Omar
(74) *Attorney, Agent, or Firm* — Cozen O'Connor

(57) ABSTRACT

A method and an apparatus for wireless charging control, and a storage medium. The method is implemented by a wireless charging device including N sets of wireless charging coils, where N is a positive integer greater than or equal to 2. The method includes controlling the N sets of wireless charging coils to perform charging at different times in response to determining that a temperature of the wireless charging device exceeds a predetermined threshold.

16 Claims, 2 Drawing Sheets

(56)            References Cited

FOREIGN PATENT DOCUMENTS

CN            110768396 A      2/2020

OTHER PUBLICATIONS

PCT/CN2019/110675 International Search Report, dated Jul. 15, 2020 2 pages.
Chinese Patent Application No. 201980002330.5, Office Action dated Feb. 9, 2024, 7 pages.
Chinese Patent Application No. 201980002330.5, English translation of Office Action dated Feb. 9, 2024, 7 pages.

* cited by examiner

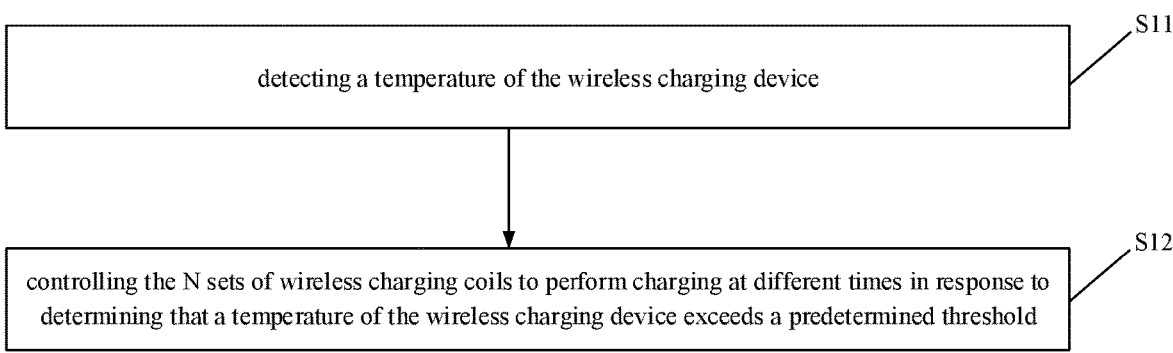

detecting a temperature of the wireless charging device — S11 controlling the N sets of wireless charging coils to perform charging at different times in response to determining that a temperature of the wireless charging device exceeds a predetermined threshold — S12

FIG. 1

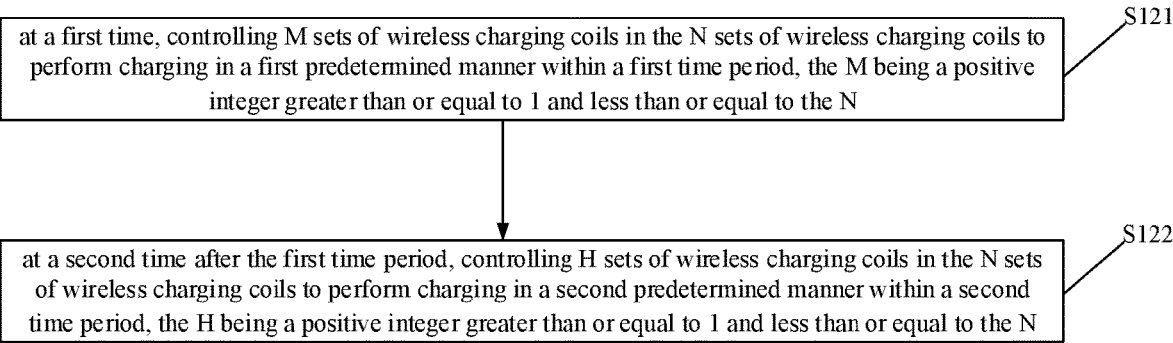

at a first time, controlling M sets of wireless charging coils in the N sets of wireless charging coils to perform charging in a first predetermined manner within a first time period, the M being a positive integer greater than or equal to 1 and less than or equal to the N — S121 at a second time after the first time period, controlling H sets of wireless charging coils in the N sets of wireless charging coils to perform charging in a second predetermined manner within a second time period, the H being a positive integer greater than or equal to 1 and less than or equal to the N — S122

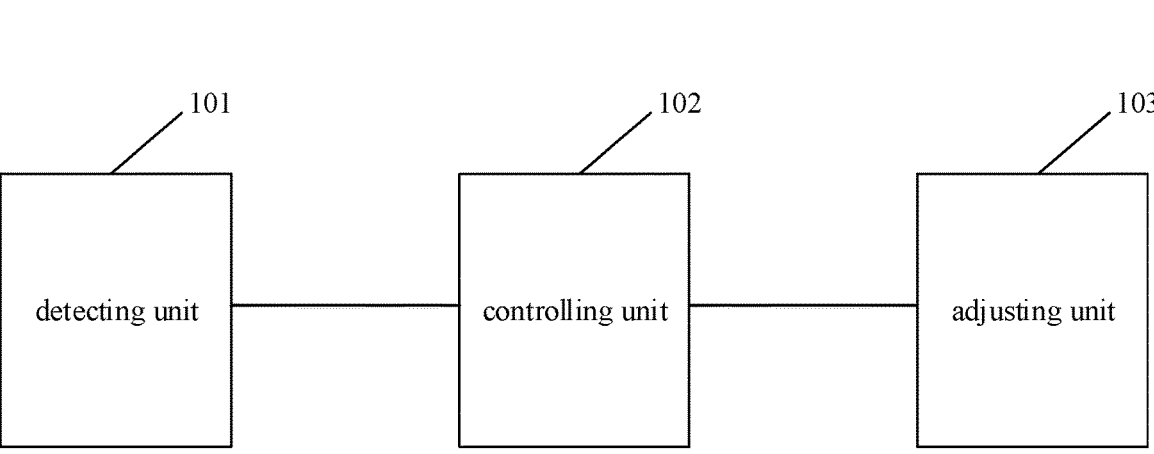

detecting unit — 101          controlling unit — 102          adjusting unit — 103

FIG. 3

METHOD AND APPARATUS FOR WIRELESS CHARGING CONTROL, AND STORAGE MEDIUM

CROSS REFERENCE TO RELATED APPLICATIONS

This application is a U.S. national phase application based on International Application No. PCT/CN2019/110675, filed Oct. 11, 2019, the content of which is incorporated herein by reference for all purposes.

TECHNICAL FIELD

The disclosure relates to a field of wireless charging technologies, and more particularly to a method for wireless charging control, an apparatus for wireless charging control, and a storage medium.

BACKGROUND

The convenience of wireless charging has resulted in wireless charging technologies being applied to more and more device charging situations. For example, the wireless charging being applied in a mobile terminal has become a popular feature for users.

Typically, when wireless charging is applied to a mobile terminal, high-power charging is accomplished by increasing the power of the wireless charging. With the high-power charging, a contact surface between the mobile terminal and a charging device may overheat, which will affect user experiences, pose security risks and even affect the performance of the mobile terminal.

SUMMARY

In a first aspect according to embodiments of the disclosure, there is provided a method for wireless charging control, implemented by a wireless charging device including N sets of wireless charging coils, where N is a positive integer greater than or equal to 2. The method includes controlling the N sets of wireless charging coils to perform charging at different times in response to determining that a temperature of the wireless charging device exceeds a predetermined threshold.

In a second aspect according to embodiments of the present disclosure, there is provided an apparatus for wireless charging control. The apparatus includes a processor; and a memory. The memory is configured to store instructions executable by the processor. When the instructions are executed by the processor, the processor is configured to detect and determine whether a temperature of the wireless charging device exceeds a predetermined threshold; control the N sets of wireless charging coils to perform charging at different times in response to determining that the temperature of the wireless charging device exceeds the predetermined threshold, where N is a positive integer greater than or equal to 2.

In a third aspect according to embodiments of the disclosure, there is provided a non-transitory computer readable storage medium. When instructions stored on the storage medium are executed by a processor of a mobile terminal, the mobile terminal is caused to implement:

detecting and determining whether a temperature of a wireless charging device exceeds a predetermined threshold;

controlling N sets of wireless charging coils comprised in the wireless charging device to perform charging at different times in response to determining that the temperature of the wireless charging device exceeds the predetermined threshold, where N is a positive integer greater than or equal to 2.

It is to be understood that both the foregoing general description and the following detailed description are exemplary and explanatory only, and are not restrictive of the disclosure.

BRIEF DESCRIPTION OF THE DRAWINGS

The accompanying drawings, which are incorporated in and constitute a part of this specification, illustrate embodiments consistent with the disclosure, and serve to explain the principle of the disclosure together with the description.

FIG. 1 is a flow chart illustrating a method for wireless charging control according to an embodiment.

FIG. 2 is a flow chart illustrating a method for charging at different times according to an embodiment.

FIG. 3 is a block diagram illustrating an apparatus for charging control at different times according to an embodiment.

DETAILED DESCRIPTION

Figure 4:
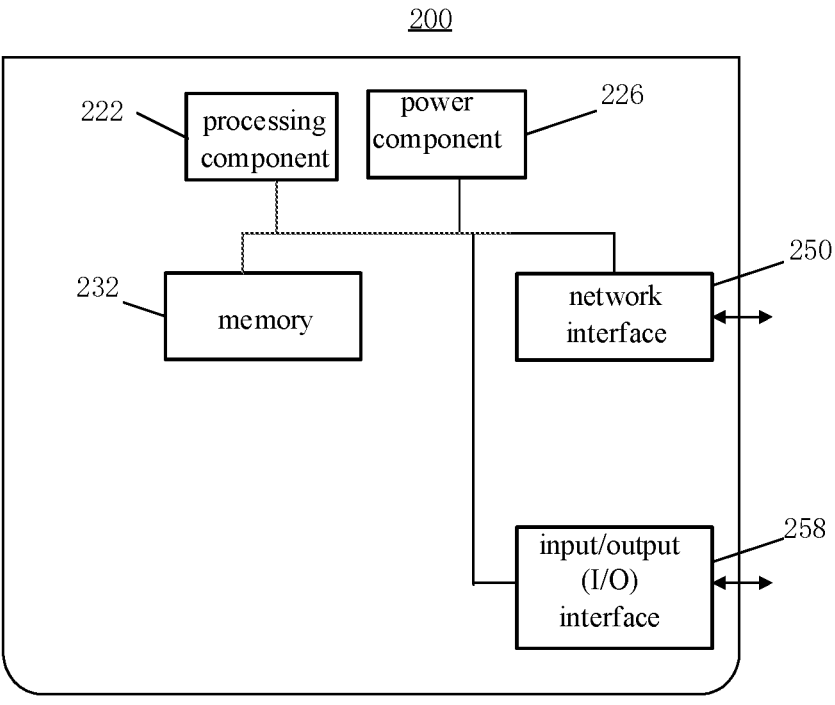
FIG. 4 is a block diagram illustrating an apparatus applicable for charging control at different times according to an embodiment.

Exemplary embodiments will be described in detail herein, examples of which are illustrated in the accompanying drawings. When the following description refers to the accompanying drawings, the same or similar elements may be denoted by the same numerals in different accompanying drawings, unless otherwise indicated. The implementations described in the following exemplary embodiments do not represent all implementations consistent with the present disclosure. Instead, they are merely examples of apparatuses and methods consistent with some aspects of the disclosure as described in the appended claims.

A method for wireless charging control provided by embodiments of the present disclosure is implemented by a wireless charging device including N sets of wireless charging coils. In the present disclosure, a plurality of sets of wireless charging coils included in the wireless charging device are divided into N sets, where N is a positive integer greater than or equal to 2. The N sets of wireless charging coils is controlled to perform charging at different times in response to determining that a temperature of the wireless charging device exceeds a predetermined threshold, so as to improve over temperature phenomenon occurred in the wireless charging device.

FIG. 1 is a flow chart illustrating a method for wireless charging control according to an embodiment. As illustrated in FIG. 1, the method for wireless charging control is implemented by a wireless charging device including N sets of wireless charging coils, and includes the following block S11 and block S12.

At block S11, a temperature of the wireless charging device is detected.

In the present disclosure, at a starting stage, N sets of wireless charging coils of the wireless charging device performs charging simultaneously. In an implementation, the temperature of the wireless charging device may be detected by a temperature sensor in the present disclosure. The temperature sensor may be in the wireless charging device. Block S12 is executed in response to detecting, by the temperature sensor, that the temperature of the wireless charging device exceeds a predetermined threshold.

The above predetermined threshold may be a temperature threshold preset based on actual requirements.

At block S12, the N sets of wireless charging coils are controlled to perform charging at different times in response to determining that the temperature of the wireless charging device exceeds the predetermined threshold.

In the present disclosure, the N sets of wireless charging coils are controlled to perform charging at different times in response to determining that the temperature of the wireless charging device exceeds the predetermined threshold, which may improve over temperature phenomenon occurred in the wireless charging device.

In the present disclosure, controlling the N sets of wireless charging coils to perform charging at different times may be understood as that some or all of the N sets of wireless charging coils perform charging in a manner of time division multiplexing.

The following describes the method for wireless charging control according to the embodiment of the present disclosure in combination with practical applications.

In the present disclosure, first, an implementation process of determining that the temperature of the wireless charging device exceeds the predetermined threshold is described.

On the one hand, in the present disclosure, the temperature of the wireless charging device is detected by the wireless charging device itself. For example, a temperature sensor for temperature detection is provided in the wireless charging device. It is determined that the temperature of the wireless charging device exceeds the predetermined threshold in response to detecting, by the wireless charging device, that the temperature of the wireless charging device exceeds the predetermined threshold. The way that the wireless charging device detects the temperature of the wireless charging device by itself may be understood as that the wireless charging device determines the temperature of the wireless charging device through a manner of in band communication.

On the other hand, in the present disclosure, the wireless charging device may interact with another device different from the current wireless charging device through a manner of out of band communication to determine that the temperature of the wireless charging device exceeds the predetermined threshold. For example, another device sends a notification message configured to notify the wireless charging device that the temperature exceeds the predetermined threshold to the current wireless charging device through out of band communication. The wireless charging device determines that the temperature of the wireless charging device exceeds the predetermined threshold after receiving the notification message sent by another device different from the wireless charging device through the out of band communication.

In the present disclosure, another device different from the wireless charging device may be a device to be charged or another wireless charging device.

In an example, another device is a terminal to be charged with a wireless charging receiving coil, and the wireless charging device is a wireless charging transmitting coil. An out of band communication module is introduced between the wireless charging receiving coil and the wireless charging transmitting coil. The terminal to be charged, after detecting that the temperature exceeds the predetermined threshold, sends the notification message to the wireless charging transmitting coil through the out of band communication module to notify the wireless charging transmitting coil that the temperature exceeds the predetermined threshold. The wireless charging transmitting coil performs charging at different times after receiving the notification message that the temperature exceeds the predetermined threshold sent by the terminal to be charged.

In the present disclosure, when another device is the device to be charged, the above notification message for notifying the wireless charging device that the temperature exceeds the predetermined threshold may be triggered by a user based on prompt information for over temperature displayed on the device to be charged. For example, in the above example, after the terminal to be charged detects that the temperature exceeds the predetermined threshold, the prompt message for over temperature is displayed on a display interface of the terminal to be charged. In a case that an overheating protection may be triggered by the user based on the prompt information, that is, a function for charging at different times of the wireless charging device is to be started, the notification message sent by the terminal to be charged to the wireless charging device for notifying the wireless charging device that the temperature exceeds the predetermined threshold is triggered by the user.

The following describes an implementation process of the N sets of wireless charging coils performing charging at different times in the present disclosure.

In a case that some or all of the N sets of wireless charging coils perform charging by the manner of time division multiplexing, it may perform charging by the manner of time division multiplexing based on manners such as stopping charging and reducing operating power.

In a case that the stopping charging manner is employed, the wireless charging device may automatically turn-off some wireless charging coils based on a pre-configuration scheme, or another device may control the wireless charging device to turn-off some wireless charging coils. In a case that the reducing operating power manner is employed, charging power of each wireless charging coil may be adjusted based on a pre-configuration scheme according to laws and regulations of various countries and regions.

FIG. 2 is a flow chart illustrating a method for controlling N sets of wireless charging coils to perform charging at different times according to an embodiment. As illustrated in FIG. 2, the method includes the following block S121 and block S122.

At block S121, at a first time, M sets of wireless charging coils in the N sets of wireless charging coils is controlled to perform charging in a first predetermined manner within a first time period. M is a positive integer greater than or equal to 1 and less than or equal to N.

The first time may be a time when it is determined that the temperature of the wireless charging device exceeds the predetermined threshold. A value of the M may be set according to actual demands. For example, M may be a value that divides N equally, and M may also be a randomly set value.

The first time period may be determined based on a temperature to be reduced for the wireless charging device.

The first predetermined manner may include one or more of a stopping charging manner and a reducing operating power manner.

At block S122, at a second time after the first time period, H sets of wireless charging coils in the N sets of wireless charging coils is controlled to perform charging in a second predetermined manner within a second time period. The H is a positive integer greater than or equal to 1 and less than or equal to the N.

In the present disclosure, the second time may be understood as a time after charging the first time period in the first predetermined manner.

Further, a value of the H may be set according to actual demands. For example, the H may be a value that divides the N equally, and the H may also be a randomly set value. The wireless charging coils in the M sets are different from the wireless charging coils in the H sets to realize charging by the manner of time division multiplexing.

Further, the second time period may be determined based on a temperature to be reduced for the wireless charging device.

In the present disclosure, the first time period and the second time period may be the same or different. A sum of the first time period and the second time period is greater than or equal to a time period required for the wireless charging device to reduce from a current temperature to the predetermined threshold.

The second predetermined manner may include one or more of the stopping charging manner and the reducing operating power manner.

In the present disclosure, the first predetermined manner and the second predetermined manner may be the same or different.

Further, in the present disclosure, the wireless charging coils in the M sets and the wireless charging coils in the H sets for performing charging at different times are preconfigured by the wireless charging device, for example, configured randomly, or configured according to predetermined rules, such as configured according to frequency or quantity.

In an implementation of the present disclosure, an operating frequency of the wireless charging coil is an adjustable operating frequency range according to characteristics of the wireless charging coil. In the present disclosure, the wireless charging coils of the N sets of wireless charging coils included in the wireless charging device may operate in the same adjustable operating frequency range or in different adjustable operating frequency ranges.

In an implementation, in a case that the N sets of wireless charging coils perform charging at different times, the wireless charging coils in different sets may be wireless charging coils with a same adjustable operating frequency range and/or different adjustable operating frequency ranges. For example, the adjustable operating frequency range of the M sets of wireless charging coils is in a range from 100 k to 120 k, and the adjustable operating frequency of the H sets of the wireless charging coils is in a range from 120 k to 140 k. In the present disclosure. In the present disclosure, the adjustable operating frequency ranges of the wireless charging coils in different sets may be overlapped.

It may be understood that the wireless charging device in the present disclosure may employ a single-frequency charging mode or a multi-frequency charging mode.

In the present disclosure, an example when the N sets of wireless charging coils perform charging with multi-frequency time division may include: during a charging process, within a predetermined charging cycle, at frequency 1, charging and communication are performed after the charging stops for t time (such as 10 ms), and then the charging continues. At frequency 2, after continuing the charging at the frequency 1, the charging and communication are performed after charging stops for the t time (e.g. 10 ms). The method for charging at different times of the present disclosure not only does not affect charging efficiency, but also may provide more guarantee for communication.

By employing the above method of performing charging in group and at different times via the wireless charging coils, the embodiment of the present disclosure may improve overheat phenomenon occurred in a contact surface between a mobile terminal and the charging device due to high-power charging, thus improving user experiences, reducing security risks and an impact of over temperature on performances of the mobile terminal.

The above method of performing charging in group and at different times via the wireless charging coils in the present disclosure may lead to a change in a charging center. As for the change in the charging center, in the present disclosure, a position of the wireless charging device is adjusted to adjust a wireless charging center after controlling the N sets of wireless charging coils to perform charging at different times, so as to ensure charging in the charging center of the wireless charging coil. For example, in the present disclosure, after performing charging in group and at different times, a position of the charging center may be automatically adjusted by a wireless charging device for one device charging multiple devices with an automatic sliding position function.

Based on the same concept, embodiments of the present disclosure also provide an apparatus for wireless charging control.

It may be understood that the method for wireless charging control provided by the embodiment of the present disclosure includes include a hardware structure and/or a software module for performing each function. In combination with units and algorithm steps of the examples described in the embodiments disclosed in the present disclosure, the embodiments of the present disclosure may be implemented in a form of hardware or a combination of hardware and computer software. Whether a certain function is executed by the hardware or a manner of the computer software driving the hardware depends on specific applications and design constraint conditions of the technical solution. Those skilled in the art may use different methods for each specific application to implement the described functions, but such implementation should not be considered as going beyond the scope of the technical solution of the embodiments of the present disclosure.

FIG. 3 is a block diagram illustrating an apparatus for wireless charging control according to an embodiment. Referring to FIG. 3, the apparatus 100 for wireless charging control implemented by a wireless charging device including N sets of wireless charging coils where N is a positive integer greater than or equal to 2.

In the present disclosure, the apparatus includes a detecting unit 101 and a controlling unit 102. In the present disclosure, the detecting unit 101 is configured to detect and determine whether a temperature of the wireless charging device exceeds a predetermined threshold. The controlling unit 10 is configured to control the N sets of wireless charging coils to perform charging at different times in response to determining that the temperature of the wireless charging device exceeds the predetermined threshold.

In an implementation, the controlling unit 102 is configured to control the N sets of wireless charging coils to perform charging at different times by performing:

at a first time, controlling M sets of wireless charging coils in the N sets of wireless charging coils to perform charging in a first predetermined manner within a first time period, where M is a positive integer greater than or equal to 1 and less than or equal to N; at a second time after the first time period, controlling H sets of wireless charging coils in the N sets of wireless charging coils to perform charging in a second predetermined manner within a second time period, where H is a positive integer greater than or equal to 1 and less than or equal to N; in which the wireless charging coils in the M sets are different from the wireless charging coils in the H sets; the first time period and the second time period are the same or different, and the first predetermined manner and the second predetermined manner are the same or different.

In another implementation, the first predetermined manner and the second predetermined manner each includes one or more of a stopping charging manner and a reducing operating power manner.

In still another implementation, the first time period and the second time period are determined according to the temperature of the wireless charging device, a sum of the first time period and the second time period is greater than or equal to a time period required for the wireless charging device to reduce from a current temperature to the predetermined threshold.

In still another implementation, the N sets of wireless charging coils include wireless charging coils with a same adjustable operating frequency range and/or different adjustable operating frequency ranges.

In still another implementation, the wireless charging coils in the M sets and the H sets are preconfigured by the wireless charging device.

In still another implementation, the detecting unit 101 is configured to determine that the temperature of the wireless charging device exceeds the predetermined threshold by performing:

detecting the temperature of the wireless charging device by the wireless charging device; determining that the temperature of the wireless charging device exceeds the predetermined threshold in response to detecting, by the wireless charging device, that the temperature of the wireless charging device exceeds the predetermined threshold.

In still another implementation, the detecting unit 101 is configured to determine that the temperature of the wireless charging device exceeds the predetermined threshold by performing:

determining that the temperature of the wireless charging device exceeds the predetermined threshold after receiving a notification message sent by another device different from the wireless charging device through out of band communication; in which the notification message is configured to notify the wireless charging device that the temperature exceeds the predetermined threshold.

In still another implementation, another device is a device to be charged or another wireless charging device.

In still another implementation, another device is a device to be charged, and the notification message is triggered by a user based on prompt information for over temperature displayed on the device to be charged.

In still another implementation, the apparatus further includes an adjusting unit 103. The adjusting unit 103 is configured to:

adjust a position of the wireless charging device to adjust a wireless charging center after controlling the N sets of wireless charging coils to perform charging at different times.

With regard to the apparatus in the above embodiments, the specific way in which each module performs the operation has been described in detail in embodiments of the method and will not be elaborated here.

FIG. 4 is a block diagram illustrating an apparatus 200 applicable for wireless charging control according to an embodiment. For example, the apparatus 200 may be provided as a wireless charging device. Referring to FIG. 4, the apparatus 200 includes a processing component 222, which further includes one or more processors and memory resources represented by a memory 232 for storing instructions executable by the processing component 222, such as an application program. The application stored in the memory 232 may include one or more modules, each corresponding to a set of instructions. Further, the processing component 222 is configured to execute the instructions to execute the above method for wireless charging control.

The apparatus 200 may also include a power component 226 configured to perform power management of the apparatus 200, a wired or wireless network interface 250 configured to connect the apparatus 200 to the network, and an input/output (I/O) interface 258. The apparatus 200 may operate based on an operating system stored in the memory 232, such as Windows Server™, Mac OS X™, Unix™, Linux™, FreeBSD™, or the like.

In an exemplary embodiment, a non-transitory computer-readable storage medium including instructions, such as a memory 232 including instructions, which may be executed by the processing component 222 of the apparatus 200 to complete the above method, is also provided. For example, the non-transitory computer-readable storage medium may be a ROM, a random access memory (RAM), a CD-ROM, a magnetic tape, a floppy disk, an optical data storage device, etc.

It can be further understood that "multiple" in the present disclosure refers to two or more, and other quantifiers are similar. "And/or" describes an association relationship between associated objects, indicating that there may be three relationships, for example, A and/or B may represent that there are three situations: A exists alone, A and B both exist, and B exists alone. The character "/" generally indicates that front and rear associated objects are an "or" relationship. The singular forms "an", "the" and "this" are also intended to include the majority forms unless the context clearly indicates other meanings.

It should be further understood that, although the terms "first", "second", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

It can be understood that in the embodiments of the present disclosure, although the operations are described in a specific order in the drawings, it should not be understood as requiring these operations to be performed in the specific order or serial order shown, or all the operations shown to obtain the desired results. Multitasking and parallel processing may be advantageous in a particular environment.

Other implementations of the disclosure will be apparent to the skilled in the art from consideration of the specification and practice of the disclosure disclosed here. This disclosure is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It should be understood that, the disclosure is not limited to the exaction construction that has been described above and illustrated in the accompanying drawings, and that various modifications and changes may be made without departing from the scope thereof. The scope of the disclosure only is limited by the appended claims.

What is claimed is:

1. A method for wireless charging control, implemented by a wireless charging device comprising N sets of wireless charging coils, N being a positive integer greater than or equal to 2, and the method comprising:

controlling the N sets of wireless charging coils to perform charging at different times in response to determining that a temperature of the wireless charging device exceeds a predetermined threshold;

wherein controlling the N sets of wireless charging coils to perform charging at different times comprises:

at a first time, controlling M sets of wireless charging coils in the N sets of wireless charging coils to perform charging in a first predetermined manner within a first period, M being a positive integer greater than or equal to 1 and less than or equal to N;

at a second time after the first period, controlling H sets of wireless charging coils in the N sets of wireless charging coils to perform charging in a second predetermined manner within a second period, H being a positive integer greater than or equal to 1 and less than or equal to N;

wherein the wireless charging coils in the M sets is different from the wireless charging coils in the H sets;

wherein the first period and the second period are determined according to the temperature of the wireless charging device, a sum of the first period and the second period is greater than or equal to a time period required for the wireless charging device to reduce from a current temperature to the predetermined threshold.

2. The method according to claim 1, wherein the first predetermined manner and the second predetermined manner each comprises one or more of a stopping charging manner and a reducing operating power manner.

3. The method according to claim 1, wherein the N sets of wireless charging coils comprise at least one of:

wireless charging coils with a same adjustable operating frequency range;

wireless charging coils with different adjustable operating frequency ranges; or a plurality of wireless charging coils with a same adjustable operating frequency range and remaining wireless charging coils with different adjustable operating frequency ranges.

4. The method according to claim 1, wherein the wireless charging coils in the M sets and the H sets are preconfigured by the wireless charging device.

5. The method according to claim 1, wherein determining that the temperature of the wireless charging device exceeds the predetermined threshold comprises:

detecting the temperature of the wireless charging device by the wireless charging device;

determining that the temperature of the wireless charging device exceeds the predetermined threshold in response to detecting, by the wireless charging device, that the temperature of the wireless charging device exceeds the predetermined threshold.

6. The method according to claim 1, wherein determining that the temperature of the wireless charging device exceeds the predetermined threshold comprises:

determining that the temperature of the wireless charging device exceeds the predetermined threshold after receiving a notification message sent by another device different from the wireless charging device through out of band communication;

wherein the notification message is configured to notify the wireless charging device that the temperature exceeds the predetermined threshold.

7. The method according to claim 6, wherein another device is a device to be charged or another wireless charging device.

8. The method according to claim 7, wherein another device is a device to be charged, and the notification message is triggered by a user based on prompt information for over temperature displayed on the device to be charged.

9. The method according to claim 1, further comprising:

adjusting a position of the wireless charging device to adjust a wireless charging center after controlling the N sets of wireless charging coils to perform charging at different times.

10. An apparatus for wireless charging control, comprising:

a processor; and a memory, configured to store instructions executable by the processor, wherein when the instructions are executed by the processor, the processor is configured to:

detect and determine whether a temperature of the apparatus exceeds a predetermined threshold;

control N sets of wireless charging coils to perform charging at different times in response to determining that the temperature of the wireless charging device exceeds the predetermined threshold;

wherein N is a positive integer greater than or equal to 2;

wherein the processor is configured to control the N sets of wireless charging coils to perform charging at different times by performing:

at a first time, controlling M sets of wireless charging coils in the N sets of wireless charging coils to perform charging in a first predetermined manner within a first period, M being a positive integer greater than or equal to 1 and less than or equal to N;

at a second time after the first period, controlling H sets of wireless charging coils in the N sets of wireless charging coils to perform charging in a second predetermined manner within a second period, H being a positive integer greater than or equal to 1 and less than or equal to N;

wherein the wireless charging coils in the M sets is different from the wireless charging coils in the H sets;

wherein the first period and the second period are determined according to the temperature of the wireless charging device, a sum of the first period and the second period is greater than or equal to a period required for the wireless charging device to reduce from a current temperature to the predetermined threshold.

11. The apparatus according to claim 10, wherein the first predetermined manner and the second predetermined manner each comprises one or more of a stopping charging manner and a reducing operating power manner.

12. The apparatus according to claim 10, wherein the N sets of wireless charging coils comprise at least one of:

wireless charging coils with a same adjustable operating frequency range;

wireless charging coils with different adjustable operating frequency ranges; or a plurality of wireless charging coils with a same adjustable operating frequency range and remaining wireless charging coils with different adjustable operating frequency ranges.

13. The apparatus according to claim 10, wherein the wireless charging coils in the M sets and the H sets are preconfigured by the wireless charging device.

14. The apparatus according to claim 10, wherein the processor is configured to determine that the temperature of the wireless charging device exceeds the predetermined threshold by performing:

detecting the temperature of the wireless charging device by the wireless charging device;

determining that the temperature of the wireless charging device exceeds the predetermined threshold in response to detecting, by the wireless charging device, that the temperature of the wireless charging device exceeds the predetermined threshold.

15. The apparatus according to claim 10, wherein the processor is configured to determine that the temperature of the wireless charging device exceeds the predetermined threshold by performing:

determining that the temperature of the wireless charging device exceeds the predetermined threshold after receiving a notification message sent by another device different from the wireless charging device through out of band communication;

wherein the notification message is configured to notify the wireless charging device that the temperature exceeds the predetermined threshold.

16. A non-transitory computer readable storage medium, when instructions stored on the storage medium are executed by a processor of a mobile terminal, causing the mobile terminal to implement:

detecting and determining whether a temperature of a wireless charging device exceeds a predetermined threshold;

controlling N sets of wireless charging coils comprised in the wireless charging device to perform charging at different times in response to determining that the temperature of the wireless charging device exceeds the predetermined threshold;

wherein N is a positive integer greater than or equal to 2;

wherein controlling the N sets of wireless charging coils to perform charging at different times comprises:

at a first time, controlling M sets of wireless charging coils in the N sets of wireless charging coils to perform charging in a first predetermined manner within a first period, M being a positive integer greater than or equal to 1 and less than or equal to N;

at a second time after the first time period, controlling H sets of wireless charging coils in the N sets of wireless charging coils to perform charging in a second predetermined manner within a second period, H being a positive integer greater than or equal to 1 and less than or equal to N;

wherein the wireless charging coils in the M sets is different from the wireless charging coils in the H sets;

wherein the first period and the second period are determined according to the temperature of the wireless charging device, a sum of the first period and the second period is greater than or equal to a time period required for the wireless charging device to reduce from a current temperature to the predetermined threshold.

* * * * *